United States Patent [19]
Fitzgibbons

[11] Patent Number: 4,648,748
[45] Date of Patent: Mar. 10, 1987

[54] CLAMP ASSEMBLY
[75] Inventor: Michael R. Fitzgibbons, Houston, Tex.
[73] Assignee: Ferranti Subsea Systems, Ltd., London, England
[21] Appl. No.: 625,144
[22] Filed: Jun. 27, 1984
[51] Int. Cl.[4] .................................. E02D 29/00
[52] U.S. Cl. .................................. 405/195; 24/458
[58] Field of Search ............... 405/169, 195, 224; 24/457, 458, 526, 569, 573; 220/324, 325, 326; 285/421; 403/338, 370, 373, 374, 409

[56] References Cited
U.S. PATENT DOCUMENTS

| 675,054 | 5/1901 | Durand | 403/367 |
|---|---|---|---|
| 974,156 | 11/1910 | Jones | 403/367 |
| 2,232,182 | 2/1941 | Melker | 403/367 |
| 2,357,246 | 8/1944 | Whitmyer | 220/325 X |
| 2,975,601 | 3/1961 | Thorson | 405/195 |
| 3,082,607 | 3/1963 | Sutton | 405/196 |
| 3,105,675 | 10/1963 | Blackburn | 254/103 |
| 3,196,995 | 7/1965 | Wilson et al. | 403/14 |
| 3,211,477 | 10/1965 | McCoy | 24/569 X |
| 3,831,789 | 8/1974 | Brewer | 414/509 |
| 3,973,625 | 8/1976 | Baugh | 285/421 X |
| 4,229,117 | 10/1980 | Coppin et al. | 403/370 |
| 4,232,497 | 11/1980 | Meschnig | 52/506 |

Primary Examiner—David H. Corbin
Attorney, Agent, or Firm—Norvell & Associates

[57] ABSTRACT

Apparatus for securing a first member to a second member includes a clamping structure having a first planar portion and a tapered second planar portion which extends transversely from the first portion. A threaded fastening member is rotatably carried by the clamping structure first portion and extends outwardly therefrom. A connecting structure is provided on the first member and includes a threaded aperture adapted for receiving the threaded fastening member. A tapered surface portion is provided on the second member for cooperative engagement with the clamping structure tapered second planar portion when the fastening member is threaded into the aperture of the connecting structure for providing a clamping force between the clamping structure and the first and second members.

4 Claims, 3 Drawing Figures

CLAMP ASSEMBLY

BACKGROUND OF THE INVENTION

This invention generally pertains to clamp assemblies. More specifically, the present invention relates to a clamp assembly in which cooperating tapered surfaces are employed to achieve a desired clamping action.

The invention is particularly applicable to a clamp assembly used for securing a subsea electrohydraulic control module to an undersea base or platform. It will be appreciated by those skilled in the art, however, that the invention has broader applications and may be adapted for use in many other environments, e.g., clamping two components together in a surface environment or in an air-borne environment.

In the drilling of offshore oil wells, it is common practice to convey various components to the well location upon a floatable barge or other support structure. At the desired location, the barge is submerged or the support structure otherwise fixedly located with respect to the well location to provide a stable platform for lowering some of the components to the ocean floor. When the barge or support structure is correctly positioned, various parts, such as wellhead protective jackets and production platform parts, can be lowered to the ocean floor and fixed in place at the well locations. Components for other undersea uses, such as ocean bottom communication cables or anti-submarine listening devices, are also lowered through the ocean and secured to the ocean floor.

During the process of lowering a subsea electrohydraulic control module to a base or platform already fixed to the ocean floor, the control module is lowered into a box-type landing base through the top. The control module is then accessible through an opening at the lower front portion of the landing base. At this point, the module needs to be secured to the base since there otherwise is a chance that it could move about the base while the electrical and hydraulic connections are being made. Such movement could be caused by machine vibrations or by water current.

A diver or a remotely operated vehicle generally is used to secure the control module to the base. Both the diver and remotely operated vehicle, however, have only a limited ability to maneuver bulky objects or to make intricate connections under water. The known-type of control module clamp assembly suffers from the problem that it is difficult to use due both to its weight and its complexity.

It has been considered desirable, therefore, to provide a clamp assembly which would be easy to work with under water by being of a lighter weight construction and simpler design than the known control module clamp assemblies. The subject invention is believed to overcome the foregoing difficulties and others, and provides the desired features and capabilities absent from prior control module clamp assemblies.

BRIEF SUMMARY OF THE INVENTION

According to the present invention, a new and improved clamp assembly is provided which can be used to secure a first member, such as a subsea electrohydraulic control module, to a second member, such as an underwater base.

More particularly oin accordance with the invention, apparatus for securing a first member to a second member includes a clamping means having a first planar portion and a tapered second planar portion extending transversely to the first portion. Threaded fastening means is rotatably carried by the clamping means first portion and extends transversely therefrom in spaced relation to the second portion. A connecting means is associated with the first member, and a threaded aperture in the connecting means is adapted for receipt of the threaded fastening means. A tapered surface portion is associated with the second member for engagement with the clamping means tapered second portion when the fastening means is threadably advanced in the connecting means aperture. In this way, a clamping force is generated by the clamping means between the first and second members.

In accordance with another aspect of the invention, the apparatus further includes a collar arrangement secured to the fastening means for preventing longitudinal movement of the fastening means with respect to the clamping means.

According to a further aspect of the invention, the threaded fastening means comprises a threaded fastener having a blunt forward or lead end, a body portion provided with a spiral screw thread, an unthreaded portion captured in the clamping means first portion, and a rear end. Preferably, the rear end includes means adapted to receive a tool to effect rotation of the fastener.

In accordance with a still further aspect of the invention, the connecting means comprises a holddown ear which is secured to the first member. The threaded aperture extends through the hold-down ear.

According to still another aspect of the invention, the second member comprises a floor plate. Preferably, the first member hold-down ear is disposed at the upper surface of the floor plate which supports the second member and is spaced away from a front edge thereof.

The principal advantage of the present invention is the provision of a new clamp assembly which can be easily maneuvered under water.

Another advantage of the invention is the provision of a clamp assembly in which mating tapered surfaces facilitate a tightly connected joint between two members.

A further advantage of the invention is the provision of a clamp assembly in which the loading forces of the clamping arrangement can be maintained within a small area.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, a preferred embodiment of which will be described in detail in thi specification and illustrated in the accompanying drawings which form a part hereof and wherein.

DETAILED DESCRIPTION OF THE PREFERRED EMBODIMENT

Figure 1:
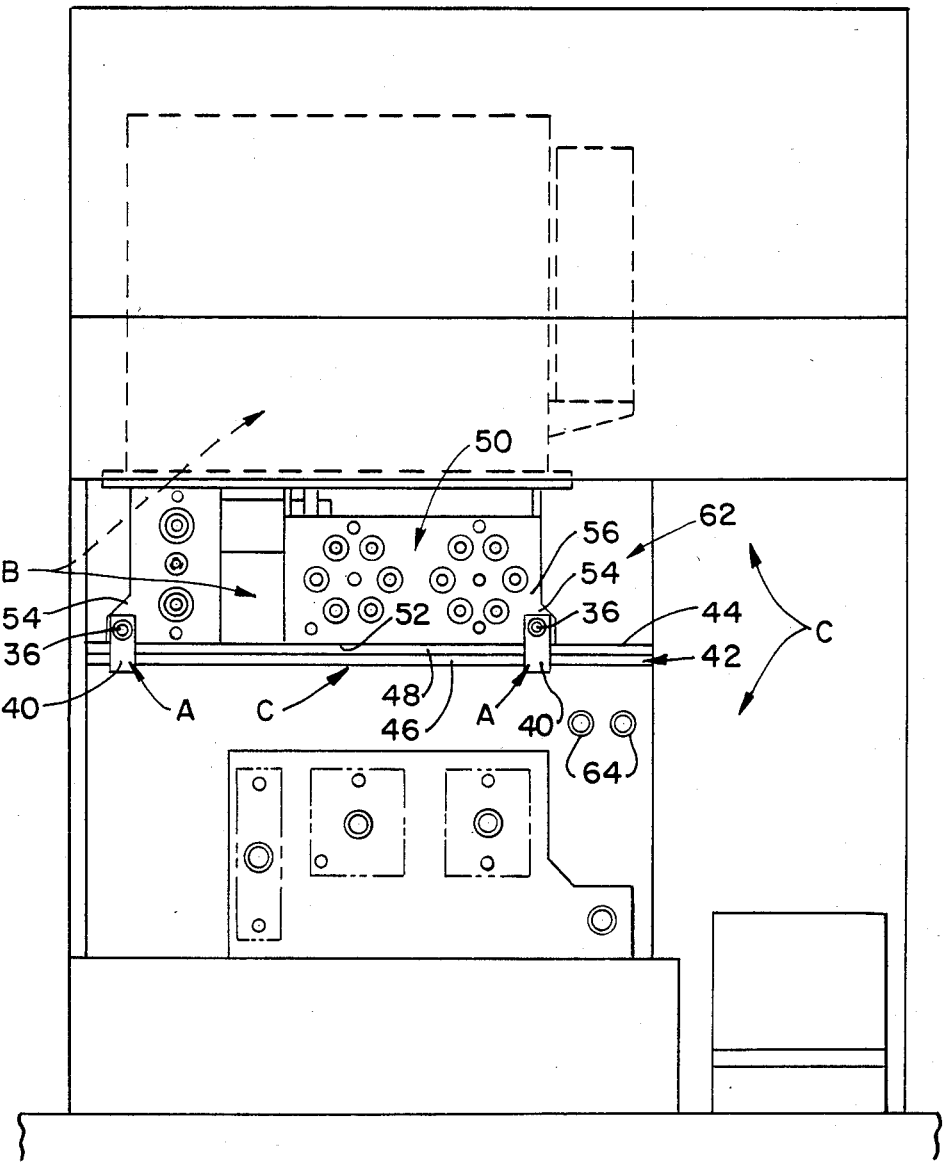
FIG. 1 is a front elevational view of a control module positioned atop a landing base and secured thereto by a preferred embodiment of the subject new clamp assembly.

Referring now to the drawings, wherein the showings are for purposes of illustrating the preferred embodiment of the invention only and not for purposes of limiting same, FIG. 1 shows a pair of the subject new clamp assemblies A in an undersea environment in which a landing control module B is secured by the clamp assemblies to a landing base C. While the new clamp assembly is primarily designed for and will hereinafter be described in connection with an undersea electrohydraulic control module which is to be secured to a box-type underwater base or platform, it will be appreciated that the overall inventive concept involved could be adapted for use in other environments. For example, the clamp assembly of the present invention could also be used for clamping two members together at the surface or in an air-borne environment.

Figure 2:
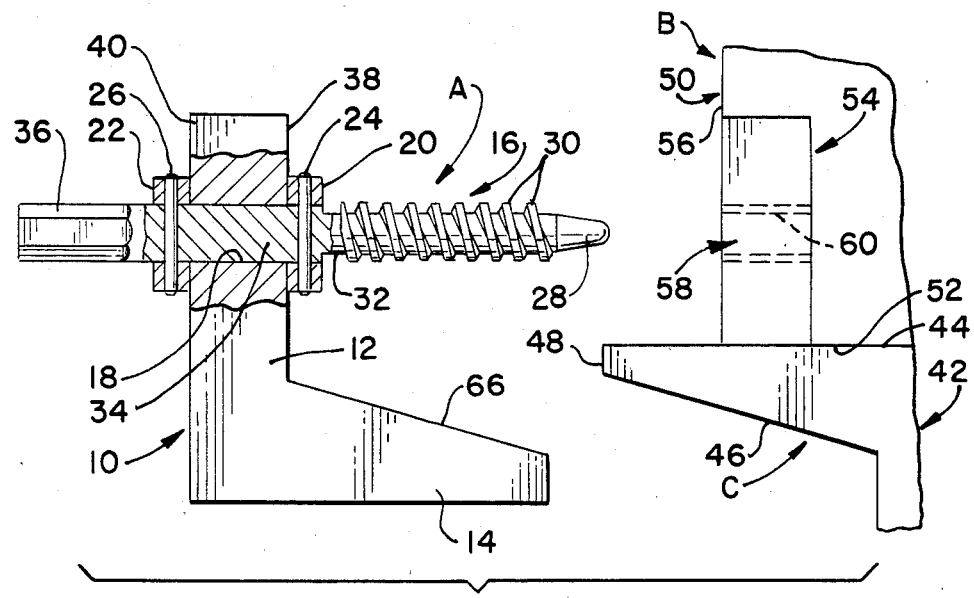
FIG. 2 is an enlarged side elevational view in partial cross-section of the clamp assembly of FIG. 1 in which the clamp assembly is shown in an aligned, spaced apart relationship with respect to the control module and the landing base; and, FIG. 3 is a side elevational view of the clamp assembly of FIG. 2 with the clamp assembly joining together the control module and the landing base.

More particularly, and with reference to FIG. 2, the clamp assembly A is shown in spaced apart, aligned relationship with respect to the control module B and the landing base C. The clamp assembly includes an L-shaped clamping portion 10 having a leg 12 and a tapered shoe or base portion 14 extending normal to the leg. A threaded fastener 16 extends through an aperture 18 in the leg 12, and, preferably, the fastener is secured in the leg against axial movement. This may be accomplished by a pair of collars 20, 22 which are affixed by respective pins 24, 26 to the fastener 16 on either side of the leg 12. In this way, the threaded fastener 16 is able to rotate in the aperture 18, but is prevented from moving longitudinally with respect thereto. It should be noted, however, that other suitable means for rotatably securing the fastener in the aperture could also be used.

The threaded fastener 16 is provided with a slightly tapered, blunt tip or front end 28. Also, a helical threaded portion 30 is provided along a portion of fastener body portion 32 adjacent front end 28. Although a conventional Acme-type thread is preferred for the threaded portion, it will be appreciated that other types of threads may also be suitably employed. It should also be noted that the blunt front end 28 of the fastener could have other conformations from that shown in the FIGURES.

A captured portion 34 of the fastener body portion 32 is unthreaded, and may have a diameter larger than the threaded portion. The diameter of captured portion 34 is, however, such that the fastener can rotate easily within aperture 18. Collars 20, 22 are fixedly secured to captured portion 34 by means of pins 24, 26, and the collars are engageable with opposed faces 38, 40 of leg 12 to retain the fastener in position. A rear portion 36 of the fastener body is provided with an outer hexagonal conformation generally along the axial extent thereof. The hexagonal conformation enables the fastener to be rotated easily by a conventional hexagonal driving tool (not illustrated) carried by a diver or a remotely operated vehicle.

While the hexagonal conformation is preferred, it could be replaced with other conventional shapes which would still accommodate ease of fastener rotation under water. Alternatively, it would also be feasible to provide a conventional internal socket in the rear portion 36 of the fastener 16, and rotatably drive the fastener with a conventional internal spline head or hex head key.

Landing base C includes a floor or base plate 42 having a planar upper surface 44, a tapered lower surface portion 46, and a blunt forward end 48. A control module B is positioned on and supported by the floor upper surface 44. The control module includes a lower module housing 50 having a lower surface 52 which rests on the floor upper surface. An ear 54 is positioned at each end of a forward surface 56 of the control module lower housing 50 (FIG. 1) and secured thereto or made a part thereof. Since the two ears are identical, only the ear 54 visible in FIG. 2 will be discussed, it being appreciated that the other ear is identical thereto and identically secured to the landing base C by a second clamp assembly A.

An aperture 58 penetrates through the ear 54, and is suitably internally threaded as at 60 to accommodate the threaded fastener 16 of the clamping portion 10. Preferably, the control module B is so lowered or positioned on the landing base C that the module holddown ear 54 is spaced from the base front end 48 for ease of cooperation between the fastener and the ear in the manner to be described.

In use, and with reference to both FIGS. 1 and 2, once the control module B is suitably lowered into or positioned in the box-type landing base C so that the hold-down ears 54 are accessible through a landing base front opening 62, an articulated arm on a remotely operated vehicle or a diver (not illustrated) can guide the clamp assembly A into the assembly position. If desired, a holding fixture 64 may advantageously be provided on the base C for holding the clamp assemblies prior to their use in securing the control module to the landing base.

In the assembly position, the fastener 16 will be axially aligned with the aperture 58 of the associated hold-down ear 54. The tapered, blunt nose 28 of the fastener acts as a pilot for the fastener in the aperture 58, and facilitates ease of location and starting. As the fastener 16 is rotated, the cooperative engagement between fastener threads 30 and aperture threads 60 causes the tapered shoe portion 14 of the clamp assembly A to be drawn toward the tapered surface portion 46 of the landing base floor plate 42.

Figure 3:
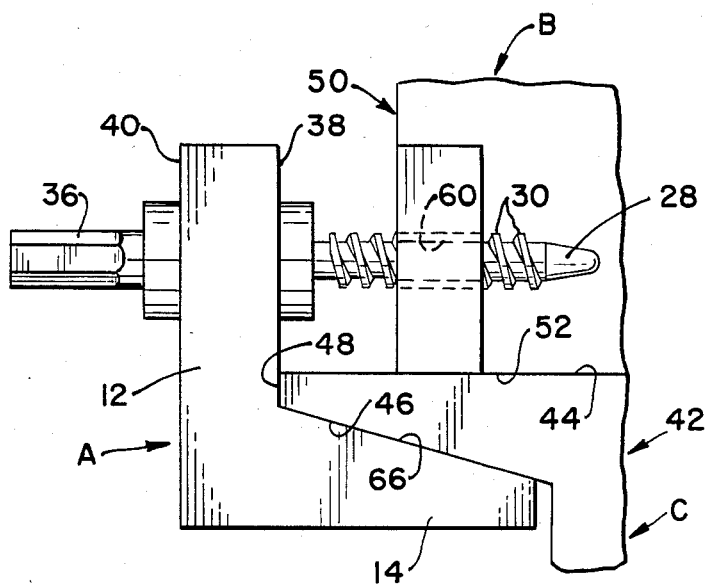

With reference to FIG. 3, such movement continues as the shoe 14 contacts and begins to slide along the tapered surface portion 46, ie., a tapered upper surface 66 of the shoe portion 14 contacts surface portion 46. Surfaces 46, 66 comprise matching tapered surfaces so that as they are brought into engagement, additional torque is applied to the fastener 16. This, in turn, places a strain on the clamping portion 10 between the fastener 16 and the upper surface 66 to set up a load or force between the control module B and the landing base C. After the torque on the fastener 16 has reached a set level, further rotation of the fastener 16 is stopped, and a self-imposed clamping force then secures the module B to the base C. This preferably occurs when the floor plate front end 48 contacts the face 38 of leg 12.

One advantage of the present invention is that lowering the control module B into the box-like landing base and securing the module to the base C does not require detailed attention to any fine alignment. Moreover, although two hold-down ears 54 positioned at each end of the forward surface 56 of the control module lower housing 50 are illustrated, the number and location of the hold-down ears can be varied. For example, suitable hold-down ears may also be provided along a rear surface of the housing 50, or even along its side surfaces, as long as a suitable base plate is provided. Such additional hold-down ears would facilitate additional securing of the control module relative to the base. Also, if desired, the control module hold-down ears 54 can be rotated slightly with respect to the lower housing forward surface 56.

The invention has been described with reference to a preferred embodiment. Obviously, modifications and alterations will occur to others upon the reading and understanding of this specification. It is intended to include all such modifications and alterations insofar as they come within the scope of the appended claims or the equivalents thereof.

Having thus described the invention, it is now claimed:

1. Apparatus for securing a first housing member of a subsea electrohydraulic control module to a second fixed base member of an undersea landing base and having a planar surface supporting said first housing member, said apparatus comprising:

an L-shaped clamping member having a planar leg portion and a tapered shoe portion, with said leg portion rotatably carrying a threaded fastener so as to have portions thereof extending outwardly from opposed faces of said leg portion, said threaded fastener having a tapered front end, being threaded along a portion of an elongated body, and having means adjacent a rear portion adapted to be rotatably driven by a drive tool, said threaded portion extending outwardly from one face of said leg portion and said rear portion extending outwardly from a face of said leg portion to said one face;

a pair of annular collar members secured to said threaded fastener on either side of said clamping member leg portion, said collar members preventing longitudinal movement of said threaded fastener with respect to said clamping member leg portion;

a hold-down ear provided on the first housing member having a threaded aperture penetrating therethrough and adapted for selective receipt of said threaded fastener; and, a tapered surface portion provided on the second fixed base member spaced from said planar surface and cooperable with said tapered shoe portion when said threaded fastener is received in said threaded aperture of said hold-down earm, whereby advancement of the threaded fastener in said aperture causes a clamping force to be generated through said clamping member and between said first housing and second fixed base members.

2. The apparatus as defined in claim 1, wherein said hold-down ear extends generally perpendicular to said planar surface of said second fixed base member.

3. The apparatus as defined in claim 2, wherein said hold-down ear is positioned adjacent said planar surface of said second fixed base member in spaced relation from a front edge of said second fixed base member.

4. The apparatus as defined in claim 1, wherein a plurality of said L-shaped clamping members and corresponding threaded fasteners, pairs of annular collar members, hold-down ears, and tapered surface portions provided on said second fixed base member secure said first housing member of said subsea electrohydraulic control module to said second fixed base member of said undersea landing base.

* * * * *

UNITED STATES PATENT AND TRADEMARK OFFICE
CERTIFICATE OF CORRECTION

PATENT NO. : 4,648,748

DATED : March 10, 1987

INVENTOR(S) : Michael R. Fitzgibbons

It is certified that error appears in the above-identified patent and that said Letters Patent is hereby corrected as shown below:

Column 1, line 66, change "oin" to --in--.

Column 6, line 15, change "earm" to --ear--.

Signed and Sealed this

Eighteenth Day of August, 1987

Attest:

DONALD J. QUIGG

Attesting Officer

Commissioner of Patents and Trademarks